(12) United States Patent
Carder et al.

(10) Patent No.: US 8,586,113 B2
(45) Date of Patent: *Nov. 19, 2013

(54) METHOD OF PREPARING HIGHLY DISPERSIBLE WHOLE GRAIN FLOUR

(75) Inventors: Gary Carder, Barrington Hills, IL (US); Robert E. Chatel, Hoffman Estates, IL (US); Yongsoo Chung, Palatine, IL (US); Justin A. French, Frisco, TX (US)

(73) Assignee: The Quaker Oats Company, Chicago, IL (US)

( * ) Notice: Subject to any disclaimer, the term of this patent is extended or adjusted under 35 U.S.C. 154(b) by 303 days.

This patent is subject to a terminal disclaimer.

(21) Appl. No.: 12/814,610

(22) Filed: Jun. 14, 2010

(65) Prior Publication Data

US 2010/0316765 A1 Dec. 16, 2010

Related U.S. Application Data

(60) Provisional application No. 61/186,862, filed on Jun. 14, 2009.

(51) Int. Cl.
A23L 1/105 (2006.01)

(52) U.S. Cl.
USPC .......................................................... 426/28

(58) Field of Classification Search
USPC .......................................................... 426/28
See application file for complete search history.

(56) References Cited

U.S. PATENT DOCUMENTS

| | | |
|---|---|---|
| 3,317,402 A | 5/1967 | Smith |
| 3,851,085 A | 11/1974 | Rodgers |
| 3,869,558 A | 3/1975 | Hampton |
| 3,925,343 A | 12/1975 | Hampton |
| 3,958,016 A | 5/1976 | Galle |
| 4,038,427 A | 7/1977 | Martin |
| 4,171,384 A | 10/1979 | Chwalek |
| 4,266,027 A | 5/1981 | Muller |
| 4,282,319 A | 8/1981 | Conrad |
| 4,330,625 A | 5/1982 | Miller |
| 4,377,602 A | 3/1983 | Conrad |
| 4,431,674 A | 2/1984 | Fulger |
| 4,435,429 A | 3/1984 | Burrows |
| 4,435,430 A | 3/1984 | Fulger |
| 4,656,040 A | 4/1987 | Fulger |
| 4,710,386 A | 12/1987 | Fulger |
| 4,777,056 A | 10/1988 | Buhler |
| 4,834,988 A | 5/1989 | Karwowski |
| 4,834,989 A | 5/1989 | Bolles |
| 4,996,063 A | 2/1991 | Inglett |
| 4,999,208 A | 3/1991 | Lengerich |
| 5,021,248 A | 6/1991 | Stark |
| 5,082,673 A | 1/1992 | Inglett |
| 5,225,219 A | 7/1993 | Inglett |
| 5,656,317 A | 8/1997 | Smits |
| 5,846,786 A | 12/1998 | Senkeleski |
| 5,888,548 A | 3/1999 | Wongsuragrai |
| 6,013,289 A | 1/2000 | Blank |
| 6,054,302 A | 4/2000 | Shi |
| 6,244,528 B1 | 6/2001 | Wallis |
| 6,287,621 B1 | 9/2001 | Lacourse |
| 6,551,366 B1 | 4/2003 | D'Souza |
| 6,720,022 B1 | 4/2004 | Arnaut |
| 6,723,358 B1 | 4/2004 | van Lengerich |
| 6,759,077 B1 | 7/2004 | Lewis |
| 7,419,694 B2 | 9/2008 | Korolchuk |
| 7,425,344 B2 | 9/2008 | Korolchuk |
| 2002/0187224 A1 | 12/2002 | Haefliger |
| 2003/0170362 A1 | 9/2003 | Manning |
| 2004/0028797 A1 | 2/2004 | Squire |
| 2004/0140584 A1 | 7/2004 | Wang |
| 2004/0151805 A1 | 8/2004 | Gao |
| 2004/0156971 A1* | 8/2004 | Wuersch et al. .............. 426/591 |
| 2004/0258829 A1 | 12/2004 | Zheng |
| 2005/0064080 A1 | 3/2005 | Creighton |
| 2005/0181114 A1* | 8/2005 | Bruemmer .................... 426/658 |
| 2006/0013940 A1 | 1/2006 | Mueller |
| 2006/0251791 A1 | 11/2006 | Rubio |
| 2006/0280838 A1 | 12/2006 | Kvist |
| 2006/0286269 A1 | 12/2006 | Shah |
| 2007/0014892 A1 | 1/2007 | Mitchell |
| 2007/0059340 A1* | 3/2007 | Bello et al. .................... 424/439 |
| 2007/0104854 A1 | 5/2007 | Foster |

(Continued)

FOREIGN PATENT DOCUMENTS

| | | |
|---|---|---|
| EP | 0609169 | 8/1994 |
| EP | 0634106 | 1/1995 |

(Continued)

OTHER PUBLICATIONS

Vasanthan, T., et al., "Dextrinization of Starch in Barley Flours with Thermostable alpha-Amylase by Extrusion Cooking", © Wiley-VCH Verlag GmbH, 69451 Weinheim, 2001, pp. 616-622.
Gutkoski, L.C., et al., "Effect of Extrusion Process Variables on Physical and Chemical Properties of Extruded Oat Products", Plant Foods for Human Nutrition, © 2000 Kluwer Academic Publishers, pp. 315-325.
Written Opinion and International Search Report for PCT Application No. PCT/US2010/038506 mailed Aug. 10, 2010, 18 pages.
Australian Patent Application No. 2010260219 Office Action dated Aug. 23, 2012.
Chinese Patent Application No. 201080022395.5 Office Action dated Nov. 8, 2012.
Canadian Patent Application No. 2761566 Office Action dated Dec. 27, 2012.
Russian Patent Application No. 2011145771 Office Action mailed Jan. 21, 2013.
Chinese Patent Application 200880025660.8, Office Action dated Aug. 2, 2012.

(Continued)

Primary Examiner — D. Lawrence Tarazano
Assistant Examiner — Hamid R Badr
(74) Attorney, Agent, or Firm — Banner & Witcoff, Ltd.

(57) ABSTRACT

A method of preparing a highly dispersible whole grain flour by hydrolyzing, milling and agglomerating grain flour. Highly dispersible hydrolyzed whole grain flours made in accordance with the present invention include an enzyme that hydrolyzes the whole grain flour while maintaining the integrity of the whole grain throughout processing. The whole grain flours of the present invention are highly dispersible in liquid and semi-solid media.

10 Claims, 2 Drawing Sheets

(56) References Cited

U.S. PATENT DOCUMENTS

| | | |
|---|---|---|
| 2007/0178199 A1 | 8/2007 | Minor |
| 2007/0184175 A1 | 8/2007 | Rubio |
| 2007/0212472 A1 | 9/2007 | Holenstein |
| 2007/0243301 A1 | 10/2007 | Barnett |
| 2007/0292583 A1 | 12/2007 | Haynes |
| 2008/0003340 A1 | 1/2008 | Karwowski |
| 2008/0008801 A1 | 1/2008 | Barnekow |
| 2008/0131582 A1 | 6/2008 | Karwowski |
| 2008/0171114 A1 | 7/2008 | Castillo Rodriguez |
| 2008/0260909 A1* | 10/2008 | Chung et al. .................. 426/72 |
| 2009/0053771 A1 | 2/2009 | Dale |
| 2009/0148562 A1 | 6/2009 | Lin |
| 2009/0181128 A1 | 7/2009 | Blumenthal |
| 2009/0238935 A1 | 9/2009 | Haynes |
| 2009/0311376 A1 | 12/2009 | Rao |

FOREIGN PATENT DOCUMENTS

| | | |
|---|---|---|
| EP | 0806434 | 11/1997 |
| EP | 0897673 | 2/1999 |
| EP | 17826999 | 5/2007 |
| GB | 1168692 | 10/1969 |
| WO | 9210106 | 6/1992 |
| WO | 03011052 | 2/2003 |
| WO | 2004086878 | 10/2004 |
| WO | 2009127687 | 10/2009 |

OTHER PUBLICATIONS

Zhang Haodong, "Starch Article Technology", Jilin Science and Technology Press, dated Feb. 29, 2008—Translation to be provided at later date.

Gualberto, D.G. et al., Effect of extrusion processing on the soluble and insoluble fiber, and phytic acid contents of cereal brans, dated Sep. 28, 1997.

Wang, Ming-chun, et al, Extrusion Technology Applied in the Nutritional Health Foods, College of Food Engineering & Biologic Technology, Tianjin University of Science and Technology, Tianjin 300457, pp. 63-66, dated Aug. 1, 2007, with English Abstract.

Wang Changquing, et al, Study on the Extruding Production Method of Soluble Oats Fiber, vol. 28, No. 2, pp. 45-48, dated Mar. 20, 2002, with English Abstract.

Inglett, G.E. et al. 1994. Oat beta-glucan-amylodextrin: Preliminary preparations and biological properties. plant Fd. for Human Nutrition. 45: 53-61.

Office Action for corresponding European Patent Application 09740225.9 dated May 16, 2011.

Linko Y Y et al: The effect of HTST-extrusion on retention of cereal alpha-amylase activity and on enzymatic hydrolisis of barley starch, Food Processing Systems, Applied Science Publ, UK, Jan. 1, 1980, pages Abstr, 4.2.25, 210-223, XP009127925, ISBN: 978-0-85334-896-2.

Anonymous: "Ovsena nahradka mlieka", XP002561727, URL:http://web.archive.org/web/20080420075151/http://www.aspsk.sk/ovsene_mlieko.htm>, retrieved from the Internet on Dec. 18, 2009, pp. 1-1, dated Apr. 20, 2008.

Anonymous: "Goldkill Instant Barley Drink", XP002561728, URL:http://web.archive.org/web/20060303003347/goldkill.com/goldkili_instant.php>, retrieved from the Internet on Dec. 28, 2009, pp. 1-2, dated Mar. 3, 2006.

Peter Koelln KGAA: "Kochjule, Hafer-Getrank mit Fruchtsaft", XP002499645, Internet Citation, URL:http://www.koelln.de/downloads/37/Kochjule.pdf>, retrieved from the Internet on Oct. 14, 2008, pp. 1-19, dated Oct. 14, 2008.

Peter Kolln KGAA: "Kolln Schmelzflocken Dinkel-Hafer", XP002499438, Internet Citation, URL:http://www.koelln.de/produkte/2/103/index.html>, retrieved from the Internet on Oct. 13, 2008, p. 1, dated Oct. 13, 2008.

Peter Kolln KGAA: "KollnFlocken Instant", XP002499437, Internet Citation, URL:http://www.koelln.de/produkte/1/15/index.html>, retrieved from the Internet on Oct. 13, 2008, p. 1, dated Oct. 13, 2008.

Office Action received for corresponding European Patent Application 09 740 225.9 mailed Oct. 11, 2010.

* cited by examiner

METHOD OF PREPARING HIGHLY DISPERSIBLE WHOLE GRAIN FLOUR

CROSS-REFERENCE TO RELATED APPLICATIONS

This application claims priority to U.S. Provisional Patent Application No. 61/186,862 filed on Jun. 14, 2009, the disclosure of which is expressly incorporated herein by reference.

FIELD OF THE INVENTION

The present invention relates generally to a method for preparing a highly dispersible whole grain flour.

BACKGROUND

Due to high cholesterol, obesity, and heart disease concerns, many consumers are interested in making healthier choices with respect to their diets. For this reason, a need exists to provide consumers with whole grain, low cholesterol products. However, with fast-paced lifestyles, it is difficult for consumers to prepare healthy meals or snacks. Therefore, a need also exists to provide the consumer with ready-to-eat nutritious products. Furthermore, there exists a need in the marketplace for a comestible that contains high levels of whole grains in drinkable forms.

It is desired to prepare a whole grain product that maintains its structure during processing (i.e., the starchy endosperm, germ and bran) to meet the FDA threshold necessary to justify a health claim. More specifically, it is desired to prepare a hydrolyzed whole grain flour that is highly dispersible in liquid or semi-solid media that maintains the structure of the whole grain during processing.

Attempts have been made in the food industry to provide a hydrolyzed whole grain that maintains its whole grain structure throughout processing; however, the hydrolyzed whole grain flours tend to clump, have an unacceptable mouthfeel and/or are unappealing to consumers. The present invention overcomes the aforementioned problems and provides consumers with a hydrolyzed whole grain flour that maintains its whole grain structure and nutritional value, and is highly dispersible in liquid and semi-solid media, thereby having an improved mouthfeel and improved consumer acceptance.

BRIEF SUMMARY

Aspects of the present invention relate to a method for preparing a hydrolyzed whole grain flour. In one aspect of the present invention, an enzyme hydrolyzes the whole grain flour while maintaining the integrity of the whole grain.

In another aspect of the instant invention, a whole grain is finely milled and subsequently agglomerated to improve dispersibility of the grain in liquid or semi-solid media. The grain used for agglomeration may be untreated/native, pre-gelatinized, or hydrolyzed.

These and other aspects, along with advantages and features of the present invention herein disclosed, will become apparent through reference to the following description. Furthermore, it is to be understood that the features of the various embodiments described herein are not mutually exclusive and can exist in various combinations and permutations.

BRIEF DESCRIPTION OF THE DRAWINGS

Numerous other objects, features and advantages of the present invention will be apparent based upon the following description of the drawings.

DETAILED DESCRIPTION OF THE INVENTION

The present invention relates to a method for preparing a highly dispersible whole grain flour. In particular, the present invention relates to a hydrolyzed whole grain flour that maintains its whole grain status throughout processing and is highly dispersible in liquid and semi-solid media. The whole grain may be any suitable cereal grain such as oat, wheat, corn (maize), rice, barley, rye, quinoa, sorghum, millet, triticale or combinations thereof. As set forth herein, "whole grain status," "whole grain standard of identity," "standard of identity as whole grain" or "maintaining the integrity of the whole grain" shall mean whole grains consisting of the intact, ground, cracked or flaked caryopsis, whose principal anatomical components—the starchy endosperm, germ and bran—are present in the same relative proportions as they exist in the intact caryopsis.

Figure 1:
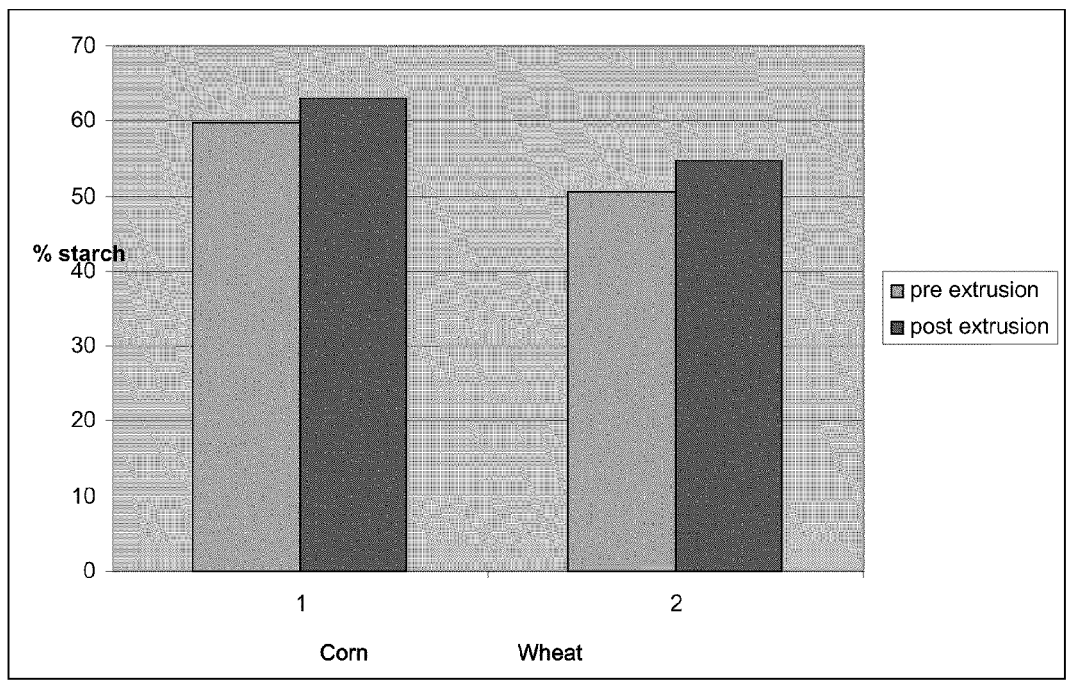
FIG. 1 illustrates the comparison of the pre-extrusion and the post-extrusion starch values of corn and whole wheat flour prepared in accordance with the present invention.
Figure 2:
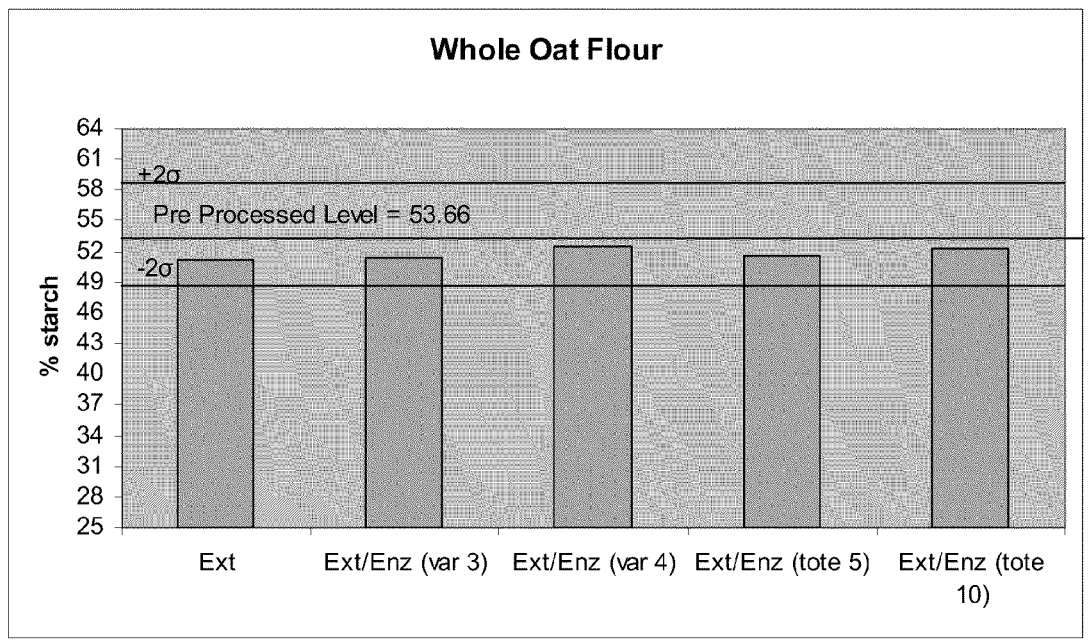
FIG. 2 illustrates a comparison of the starch content of whole oat flour samples pre and post processing via extrusion and pre and post processing via extrusion and enzyme addition.

In one aspect of the present invention, the method of hydrolyzing the whole grain flour includes hydrolyzing, milling, and agglomerating the whole grain flour. More specifically, the flour is hydrolyzed using an enzyme. The enzyme used in accordance with the present invention allows the whole grain flour to maintain its standard of identity as whole grain. One example of an enzyme that hydrolyzes the whole grain flour while maintaining the integrity of the whole grain is alpha amylase. The enzyme used in accordance with the present invention may be any enzyme that hydrolyzes the alpha 1-4 bonds on the amlyopectin molecule that makes up the starch portion of the whole grains. One of ordinary skill in the art of the food sciences would recognize that one or more enzymes may be used in accordance with the present invention. Testing and analysis of whole grain flours, such as wheat flour and oat flour using the method set forth herein, has verified and validated that the starch molecules are maintained throughout processing. The results of this testing are illustrated in FIGS. 1 and 2. As shown in Table 1 below, any change of the food constituents made in accordance with this aspect of the invention is negligible at best.

TABLE 1

|  | Whole oat flour | Hydrolyzed oat flour |
| --- | --- | --- |
| β-glucan, % | 4.19 | 4.12 |
| TDF, % | 10.5 | 11.99 |
| Fat, % | 7.49 | 6.77 |
| Protein, % | 14.07 | 13.81 |
| Starch, % | 65.02 | 66.16 |
| Maltose, % | 0 | 0.26 |

By maintaining the whole grain status throughout processing, "whole grain" health claims may be made with respect to the hydrolyzed whole grain flour made in accordance with the present invention. Furthermore, the nutritional backbone of the whole grain is maintained throughout processing; therefore, the hydrolyzed whole grain flour produced by the method set forth herein provides the same nutritional benefits as un-hydrolyzed whole grain flours.

In one aspect of the present invention, the dry whole grain flour is preconditioned by hydrating a whole grain flour starting mixture with water and steam to an overall moisture of about 30% (dw). At least one enzyme that hydrolyzes the whole grain flour while maintaining the integrity of the whole grain is then added to the mixture. In another aspect of the present invention, the dry whole grain flour may be mixed with sugar, maltodextrin and/or mixed tocopherols.

After a suitable amount of time to hydrolyze the whole grain flour, the enzyme-treated mixture is then subjected to an extrusion process to continue to break down and hydrolyze the whole grain flour and to gelatinize and cook the mixture to form a cooked hydrolyzed whole grain dough. The mixture resides in the extruder for a time sufficient to gelatinize and cook the starch, generally at least 1 minute, typically, about 1 to about 1.5 minutes. Generally, the material is heated from an initial inlet temperature to a final exit temperature in order to provide the energy for starch gelatinization. In one aspect of the present invention, the dough pressure at the exit of the cooking extruder is about 900-1000 psi. Prior to exiting the cooking extruder, the dough is heated to about 250-300° F., for instance about 265-285° F. to fully deactivate the enzyme.

The resulting product may be pelletized using a forming extruder and dried. In one aspect of the present invention the process takes about 9-10 minutes from the preconditioner step through the extruder and forming extruder. Moreover, the pellets may be finely milled to about 50-200 microns. One type of milling process that can be used to finely mill the pellets includes gradual reduction roller mill processing. Finally, the finely milled hydrolyzed grain flour may be agglomerated to about 400-700 microns. Fine milling of the pellets improves the mouthfeel of the resulting hydrolyzed oat flour and therefore improves consumer acceptance of the resulting product.

The agglomeration step post-milling is advantageous in that it optimizes and drastically improves dispersibility and lends itself to many applications for preparing comestible products. In one aspect of the present invention, the fine whole grain particles are agglomerated using a 2% sugar binder solution. For example, the agglomerated hydrolyzed grain flour can be added to, and is highly dispersible in, liquid and semi-solid media such as water, milk, juice, yogurts, puddings and other drinkable snack forms. Moreover, the agglomerated hydrolyzed grain flour made in accordance with the present invention makes it easy for consumers to effortlessly and efficiently stir the flour into the liquid or semi-solid of their choosing using common household utensils due to the rapid dispersion of the hydrolyzed grain flours into these liquids or semi-solids. Moreover, the agglomerated hydrolyzed grain flour made in accordance with this invention may be dispersed into liquid media by simply shaking to mix the constituents.

In one example of the present invention, the agglomerated hydrolyzed oat flour made in accordance with the present invention exhibits the properties identified in Table 2 below:

TABLE 2

| Sieve # | Size, micron | % retained |
| --- | --- | --- |
| #20 Mesh | 841 | 0% |
| #40 Mesh | 420 | 20.4% |
| #60 Mesh | 250 | 48.7% |
| #80 Mesh | 178 | 21.2% |
| #100 Mesh | 150 | 5.8% |
| Passes thru #100 Mesh | <150 | 3.0% |
| Yield | | 99.5% |
| Density | 0.4 | gram/cc |
| Moisture | 8.52 | % |

In another aspect of the present invention, untreated/native whole grain is finely milled to a particle size of about 50-420 microns, such as about 50-200 microns. These finely milled particles are then agglomerated to about 400-1000 microns, such as about 400-700 microns. The finely milled native whole grain flour may be agglomerated using any methods known in the industry, including, without limitation, using a sugar binder solution.

In yet another aspect of the present invention, pre-gelatinized whole grain flour is finely milled to a particle size of about 50-420 microns, such as 50-200 microns. The whole grains may be pre-gelatinized or pre-treated using any commercially acceptable means, including, without limitation steam treating and boiling. These finely milled pre-gelatinized whole grain particles are then agglomerated to about 400-1000 microns, such as 400-700 microns.

Another aspect of this invention includes finely milling one or more whole grain flours selected from the group consisting of native, pre-gelatinized and hydrolyzed whole grain flours. The whole grain flours are finely milled to a particle size of about 50-420 microns, such as 50-200 microns. These finely milled pre-gelatinized whole grain particles are then agglomerated to about 400-1000 microns, such as 400-700 microns.

Currently no methods exist to improve mouthfeel of a whole grain by reducing its particle size and subsequently agglomerating to improve dispersibility of the grain in liquid or semi-solid media. Moreover, the ability to easily shake or stir the agglomerated whole grains made in accordance with the instant invention for consumption of large amounts of whole grains is not only advantageous from a marketability and consumer acceptance standpoint, but is not known in the industry.

The agglomerated whole grain flours made in accordance with aspects of this invention maintain the whole grain status throughout processing. Therefore, "whole grain" health claims may be made with respect to the flour made in accordance with the present invention.

The highly dispersible whole grain flour prepared in accordance with the present invention may be used to provide the consumer with a drinkable grain product. For example, hydrolyzed oat flour prepared in accordance with the present invention may be added to water, milk, juice, yogurts, puddings, etc., to make a whole grain oat drinkable snack that is nutritious and easy to consume. Moreover, since the hydrolyzed whole grain flour is highly dispersible in liquids and semi-solids, the drinkable snack is also fast and easy to prepare. Similarly, the native and pre-gelatinized agglomerated flours may be added to the water, milk, juice, yogurts, puddings, etc. to make a whole grain drinkable snack.

This invention may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

We claim:

1. A method of preparing a highly dispersible whole grain flour comprising the steps of:
   a) hydrolyzing a whole grain flour using alpha-amylase, the alpha-amylase hydrolyzes the whole grain flour while maintaining the integrity of the whole grain; and then heating the hydrolyzed whole grain flour to temperature to deactivate the alpha-amylase;

b) finely milling the hydrolyzed whole grain flour to a particle size of about 50-200 microns; and c) agglomerating the whole grain flour.

2. The method of claim 1 wherein the whole grain flour is selected from the group consisting of suitable cereal grain such as oat, wheat, corn, rice, barley, rye, quinoa, sorghum, millet, triticale and combinations thereof.

3. The method of claim 1 wherein the particle size of the agglomerated whole grain flour is about 400-1000 microns.

4. The method of claim 3 wherein the particle size of the agglomerated whole grain flour is about 400-700 microns.

5. A method of preparing a highly dispersible whole grain flour comprising the steps of:

a) combining a whole grain flour starting mixture and alpha-amylase to form an enzyme starting mixture, the alpha-amylase hydrolyzes the whole grain flour while maintaining the integrity of the whole grain;

b) introducing the enzyme starting mixture to an extruder;

c) gelatinizing the whole grain flour by mechanical action and heating the extruder to form hydrolyzed whole grain flour dough, and increasing the temperature of the dough in the extruder to a temperature to deactivate the enzyme;

d) pelletizing the hydrolyzed whole grain flour dough to form hydrolyzed whole grain pellets;

e) finely milling the hydrolyzed whole grain pellets to form hydrolyzed whole grain particles having a particle size of about 50-200 microns; and f) agglomerating the hydrolyzed whole grain particles to form highly dispersible hydrolyzed whole grain flour.

6. The method of claim 5 wherein the whole grain flour is selected from the group consisting of suitable cereal grain such as oat, wheat, corn, rice, barley, rye, quinoa, sorghum, millet, triticale and combinations thereof.

7. The method of claim 5 further comprising adding the highly dispersible hydrolyzed whole grain flour to a comestible.

8. The method of claim 7 wherein the comestible is selected from the group consisting of water, milk, juice, yogurt and pudding.

9. The method of claim 5 wherein the hydrolyzed whole grain particles are agglomerated to a particle size of about 400-1000 microns.

10. The method of claim 9 wherein the hydrolyzed whole grain particles are agglomerated to a particle size of about 400-700 microns.

\* \* \* \* \*